(No Model.)
S. BARTHOLOMEW.
BUG EXTERMINATOR.
No. 495,654. Patented Apr. 18, 1893.
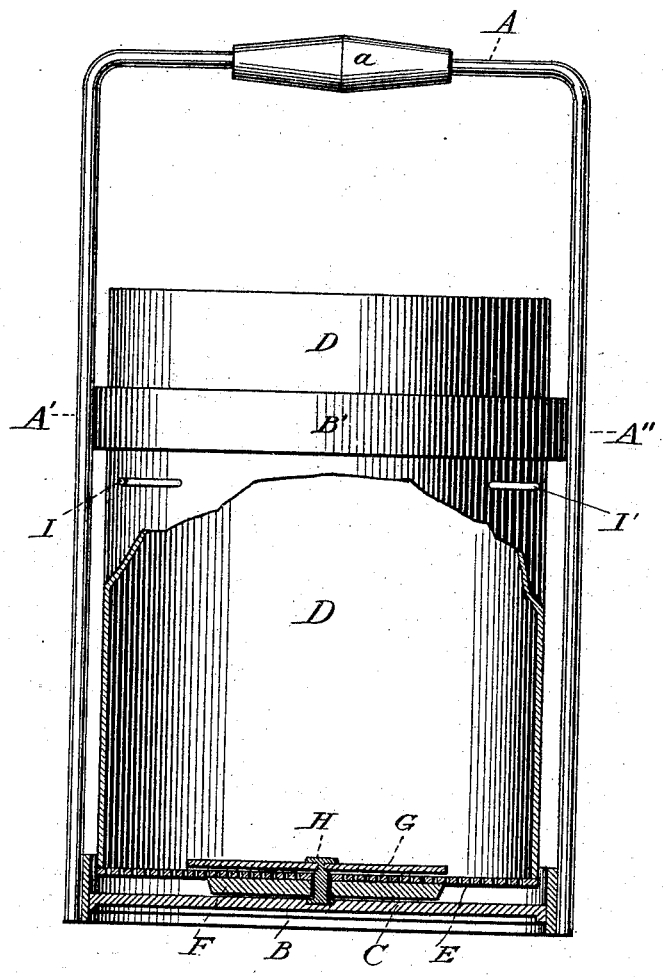
Witnesses:
Talcott Carpenter
W. H. Howard
Inventor:
Seth Bartholomew
By Wm. M. Loughlin
his Attorney

UNITED STATES PATENT OFFICE.

SETH BARTHOLOMEW, OF BURR OAK, MICHIGAN.

BUG-EXTERMINATOR.

SPECIFICATION forming part of Letters Patent No. 495,654, dated April 18, 1893.

Application filed February 10, 1892. Serial No. 421,069. (Model.)

*To all whom it may concern:*

Be it known that I, SETH BARTHOLOMEW, of Burr Oak, in the county of St. Joseph and State of Michigan, have invented a new and useful Bug-Exterminator, of which the following is a full and exact description.

The invention relates to an improved device for the even distribution of pulverized paris green, plaster or other powdered material used on plants as a bug destroyer, and has for its object to provide a simple cheap and practical device easy of operation and efficient in action. These objects I attain by the construction and combination of parts as hereinafter described and indicated in the claims, reference being had to the accompanying drawing forming a portion of this specification and the letters of reference marked thereon.

The single figure thereon is a side elevation of the implement with the lower portion of the receptacle cut out disclosing the details of the device through its axial center.

"A A' A''" is a metal rod bent so as to form a cross handle bar "A" and two dependent arms "A' A''" and is connected at the lower ends and a suitable distance up therefrom by two circular bands "B B'" which loosely encircle a cylindrical receptacle "D" furnished with a perforated bottom "E" having a rectangular bar "F," preferably half the length of the diameter of said bottom secured underneath the same.

"C" is a strip secured to the lower band "B" extending across the diameter of the same and designed to support the receptacle "D," and also to maintain its concentric adjustment inside the encircling bands "B B'," which is effected by a pivot "H" erected on the center of the length of the strip "C" and passing loosely through the bar "F" and the bottom "E" and upon which a distributer "G" consisting of radial arms with an aperture in the center is rigidly attached.

Two stop pins "I I'" are secured to the exterior of the receptacle "D" at a suitable relative distance to regulate its motion by alternate contact with the dependent arms "A' A''."

"a" is a handle secured to the handle bar "A."

The receptacle "D" being filled with a mixture of paris green and plaster or other powder, the operator grasps the implement by the handle "a" and imparts thereto a twisting movement, causes the receptacle "D" to oscillate between the stop pins "I I'" which strike the rods "A' A''" with a series of alternate shocks, and the distributer "C" being secured to the frame by the pivot "H" also partakes of the movement imparted by the operator, and agitates the powder contained in the receptacle "D," thus preventing it from becoming clogged and insures an even and continuous distribution thereof.

Having thus fully described my invention, what I claim as new, and desire to secure by Letters Patent, is—

1. In a bug exterminator, the combination with the frame formed of the rod "A A' A''" and handle "a" the circular bands "B B'" the receptacle "D" loosely encircled thereby, and the strip "C," of the distributer "G" rigidly secured thereto by the pivot "H" as hereinbefore described and for the purpose set forth.

2. In a bug exterminator the combination with the frame consisting of the rod "A A' A''" and handle "a," the circular bands "B B'" the strip C attached to and supported by the lower band B and distributor "G" secured to C by the pivot "H." of the receptacle "D" having stop pins "I I'" perforated bottom "E" with rectangular bar "F" secured thereto and having openings therein through which the pivot "H" passes loosely as hereinbefore described and for the purposes set forth.

SETH BARTHOLOMEW.

Witnesses:
W. B. McLOUGHLIN,
M. R. McLAUGHLIN.